United States Patent
Huschke

(10) Patent No.: US 10,154,474 B2
(45) Date of Patent: Dec. 11, 2018

(54) SPECTRAL EFFICIENCY BASED FREQUENCY SELECTION FOR SINGLE FREQUENCY NETWORK TRANSMISSIONS

(71) Applicant: Telefonaktiebolaget LM Ericsson (publ), Stockholm (SE)

(72) Inventor: Jörg Huschke, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/574,297

(22) PCT Filed: May 20, 2015

(86) PCT No.: PCT/EP2015/061120
§ 371 (c)(1),
(2) Date: Nov. 15, 2017

(87) PCT Pub. No.: WO2016/184515
PCT Pub. Date: Nov. 24, 2016

(65) Prior Publication Data
US 2018/0139722 A1    May 17, 2018

(51) Int. Cl.
*H04W 72/00* (2009.01)
*H04W 16/10* (2009.01)
(Continued)

(52) U.S. Cl.
CPC ......... *H04W 72/005* (2013.01); *H04W 16/10* (2013.01); *H04W 72/0453* (2013.01); *H04W 76/40* (2018.02); *H04W 72/046* (2013.01)

(58) Field of Classification Search
CPC .......... H04W 72/005; H04W 72/0453; H04W 72/044; H04W 72/046; H04W 76/40; H04W 16/10
See application file for complete search history.

(56) References Cited

U.S. PATENT DOCUMENTS 6,032,046 A    2/2000  Nakano
6,112,092 A *  8/2000  Benveniste ........... H04W 16/04
                                                    455/450
(Continued)

FOREIGN PATENT DOCUMENTS

EP    2369874 A1    9/2011
WO    2008095523 A1    8/2008

OTHER PUBLICATIONS

Electronic Communications Committee, "ECC Report 186: Technical and operational requirements for the operation of white space devices under geo-location approach," Jan. 1, 2013, pp. 1-181.
(Continued)

*Primary Examiner* — Kevin D Mew
(74) *Attorney, Agent, or Firm* — Coats & Bennett, PLLC

(57) ABSTRACT

An MBMS or eMBMS service may be transmitted in multiple MBSFN areas each using a different operating frequency. These MBSFN areas may be contiguous or discontiguous. The operating frequencies for the different MBSFN areas may be selected with the aim of utilizing a minimum set of frequencies for each service, thereby allowing for maximizing overall capacity which can be achieved by the available frequencies. A mechanism of selecting the operating frequencies which locally avoids utilization of frequencies which offer only low performance is proposed.

20 Claims, 6 Drawing Sheets

(51) Int. Cl.
*H04W 72/04* (2009.01)
*H04W 76/40* (2018.01)

(56) References Cited

U.S. PATENT DOCUMENTS

| | | | | |
|---|---|---|---|---|
| 9,559,798 | B2* | 1/2017 | Nuss | H04W 16/10 |
| 9,826,408 | B2* | 11/2017 | Madan | H04W 16/10 |
| 9,839,035 | B2* | 12/2017 | Madan | H04W 72/0453 |
| 2011/0170437 | A1* | 7/2011 | Zhou | H04W 16/04 370/252 |
| 2012/0122467 | A1* | 5/2012 | Auer | H04W 16/10 455/452.1 |
| 2013/0263190 | A1 | 10/2013 | Aravindakshan | |
| 2015/0282178 | A1* | 10/2015 | Kim | H04B 7/2656 370/329 |
| 2015/0311973 | A1* | 10/2015 | Colavolpe | H04L 25/03171 370/317 |
| 2016/0066202 | A1* | 3/2016 | Dayanandan | H04W 72/0453 370/252 |
| 2016/0094318 | A1* | 3/2016 | Shattil | H04B 7/026 375/267 |
| 2017/0085411 | A1* | 3/2017 | Noerpel | H04L 27/36 |

OTHER PUBLICATIONS

Dudda, T., "Capacity of cellular networks deployed in TVWhite Space", Diploma Thesis, Dec. 16, 2011, pp. 1-91, Institute for Networked Systems RWTH Aachen University.

* cited by examiner

| | | | | |
|---|---|---|---|---|
| F1, S1 | F1, S1 | F1, S1 | F3, S1 | F3, S1 |
| F1, S1 | F1, S1 | F1, S1 | F3, S1 | F3, S1 |
| F1, S1 | F2, S1 | F2, S1 | F3, S1 | F3, S1 |
| F2, S1 | F2, S1 | F2, S1 | F1, S2 | F1, S2 |

FIG. 5

SPECTRAL EFFICIENCY BASED FREQUENCY SELECTION FOR SINGLE FREQUENCY NETWORK TRANSMISSIONS

TECHNICAL FIELD

The present invention relates to methods for controlling single frequency network transmissions and to corresponding devices.

BACKGROUND

In cellular networks, e.g., as specified by 3GPP ($3^{rd}$ Generation Partnership Project), it is known to use broadcast or multicast transmission modes for efficiently providing one or more services, e.g., multimedia services such as mobile TV, to a plurality of users. Such multicast or broadcast transmission modes may allow simultaneous reception of the data by a large number of users while avoiding excessive usage of radio resources, because multiple users may receive the data from the same radio resources. Examples of such broadcast or multicast transmission modes are MBMS (Multimedia Broadcast Multicast Service) as specified in 3GPP TS 23.246 V13.0.0 (2015-03) for the UMTS (Universal Mobile Telecommunications System) radio technology and the LTE (Long Term Evolution) radio technology. In the context of LTE, MBMS is also referred to as eMBMS (evolved Multimedia Broadcast Multicast Service), and details concerning eMBMS are for example specified in 3GPP TS 36.440 V12.0.0 (2014-09).

In MBMS and eMBMS, multicast data are transmitted synchronously by multiple base stations on a single frequency. This kind of transmission is also referred to as single frequency network transmission, specifically as MBSFN (MBMS Single Frequency Network) transmission. As compared to unicast transmissions of the same date to multiple users, such MBSFN transmissions allow for a more efficient utilization of the available radio resources. However, also the availability of frequencies for MBSFN transmissions is limited. Further, MBMS transmissions are subject to certain constraints. For example, all transmitters participating in a MBSFN transmission need to use the same modulation and coding scheme (MCS). At the same time, relevant parameters such as Inter Site Distance (ISD), i.e., the distance between different participating base stations, propagation characteristics, transmit power constraints, and external interference, are typically subject to geographical variations and/or variations depending on the utilized frequency.

Accordingly, there is a need for techniques which allow for efficiently selecting frequencies utilized for MBSFN transmissions or other kinds of single frequency network transmissions.

SUMMARY

According to an embodiment of the invention, a method of controlling single frequency network transmissions in a radio communication network is provided. The method comprises the following steps:

A) determining a set of multiple available frequencies;
B) dividing a coverage area of the radio communication network into a set of subareas;
C) for each frequency from the set of available frequencies and for each of the subareas, determining a capacity achievable by single frequency network transmissions in the subarea;
D) for each frequency from the set of available frequencies, determining that one of the subareas which has the lowest capacity;
E) selecting that one of the frequencies from the set of available frequencies, for which the capacity of the subarea having the lowest capacity is maximal, as operating frequency for performing single frequency transmissions in the subareas;
F) for the subarea having the lowest capacity on the respective selected operating frequency determining that one of the frequencies from the set of available frequencies, for which the achievable capacity in this subarea is maximal and adding this frequency to a set of candidate frequencies;
G) for each of the subareas, selecting that frequency from the set of candidate frequencies, for which the achievable capacity in the respective subarea is maximal, as new operating frequency for performing single frequency transmissions in this subarea;
H) determining a spectral efficiency based on the achievable capacity on the operating frequency selected for each of the subareas and a number of frequencies in the set of candidate frequencies; and
I) depending on the spectral efficiency, repeating steps F) to H).

According to a further embodiment of the invention, a device is provided. The device comprises an interface for controlling single frequency transmissions in a coverage area of a communication network. Further the device comprises at least one processor. The at least one processor is configured to:

a) determine a set of multiple available frequencies;
b) divide a coverage area of the radio communication network into a set of subareas;
c) for each frequency from the set of available frequencies and for each of the subareas, determine a capacity achievable by single frequency network transmissions in the subarea;
d) for each frequency from the set of available frequencies, determine that one of the subareas which has the lowest capacity;
e) select that one of the frequencies from the set of available frequencies, for which the capacity of the subarea having the lowest capacity is maximal, as operating frequency for performing single frequency transmissions in the subareas;
f) for the subarea having the lowest capacity on the respective selected operating frequency determine that one of the frequencies from the set of available frequencies, for which the achievable capacity in this subarea is maximal and add this frequency to a set of candidate frequencies;
f) for each of the subareas, select that frequency from the set of candidate frequencies, for which the achievable capacity in the respective subarea is maximal, as new operating frequency for performing single frequency transmissions in this subarea;
f) determine a spectral efficiency based on the achievable capacity on the operating frequency selected for each of the subareas and a number of frequencies in the set of candidate frequencies; and
i) depending on the spectral efficiency, repeat operations f) to h).

According to a further embodiment of the invention, a computer program or computer program product is provided, e.g., in the form of a non-transitory storage medium, which comprises program code to be executed by at least one processor of a device configured to control single frequency network transmissions in a radio communication network. Execution of the program code causes the at least one processor to perform the following steps:

A) determining a set of multiple available frequencies;

B) dividing a coverage area of the radio communication network into a set of subareas;

C) for each frequency from the set of available frequencies and for each of the subareas, determining a capacity achievable by single frequency network transmissions in the subarea;

D) for each frequency from the set of available frequencies, determining that one of the subareas which has the lowest capacity;

E) selecting that one of the frequencies from the set of available frequencies, for which the capacity of the subarea having the lowest capacity is maximal, as operating frequency for performing single frequency transmissions in the subareas;

F) for the subarea having the lowest capacity on the respective selected operating frequency determining that one of the frequencies from the set of available frequencies, for which the achievable capacity in this subarea is maximal and adding this frequency to a set of candidate frequencies;

G) for each of the subareas, selecting that frequency from the set of candidate frequencies, for which the achievable capacity in the respective subarea is maximal, as new operating frequency for performing single frequency transmissions in this subarea;

H) determining a spectral efficiency based on the achievable capacity on the operating frequency selected for each of the subareas and a number of frequencies in the set of candidate frequencies; and I) depending on the spectral efficiency, repeating of steps F) to H).

Details of such embodiments and further embodiments will be apparent from the following detailed description of embodiments.

BRIEF DESCRIPTION OF THE DRAWINGS

FIG. 5 schematically illustrates an example of a selection of operating frequencies as obtained by a method according to an embodiment of the invention.

DETAILED DESCRIPTION OF EMBODIMENTS

In the following, concepts in accordance with exemplary embodiments of the invention will be explained in more detail and with reference to the accompanying drawings. The illustrated embodiments relate to control of single frequency network transmissions in a radio communication network. The radio communication network may for example be a cellular network, e.g., based on the UMTS or LTE radio technology. The single frequency network transmissions may thus correspond to MBSFN transmissions for providing one or more services to devices connected to the cellular network, e.g., MBMS or eMBMS services. However, it is to be understood that the illustrated concepts could also be applied in connection with other radio technologies.

Figure 1:
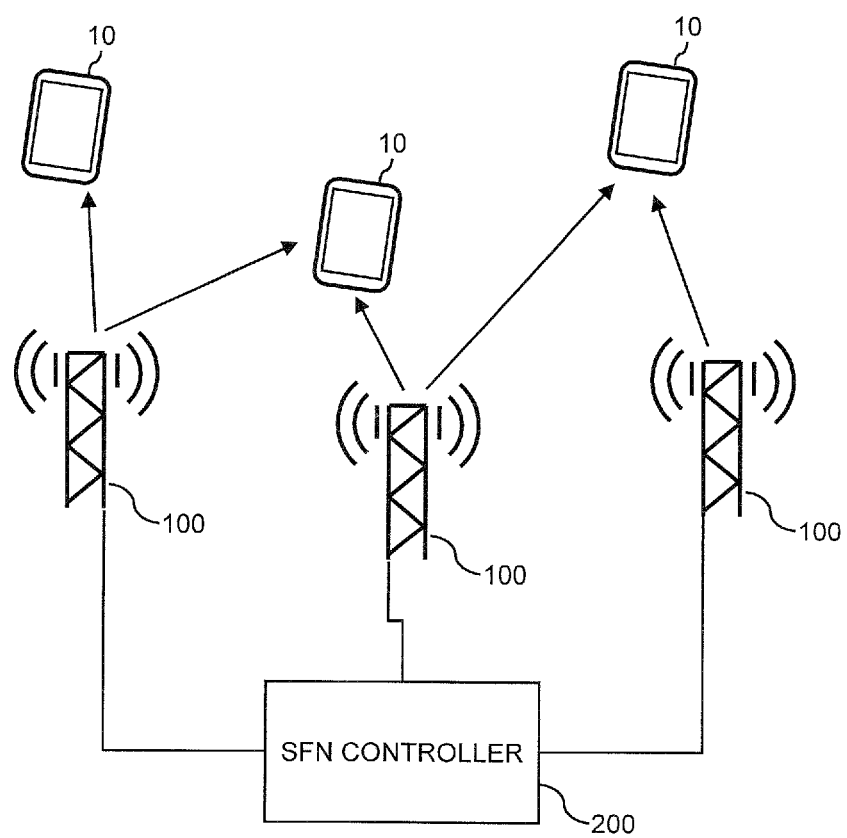
FIG. 1 schematically illustrates a communication network environment in which single frequency network transmissions may be controlled according to an embodiment of the invention.

FIG. 1 schematically illustrates infrastructure of the radio communication network which may be utilized to perform the single frequency network transmissions. Specifically, FIG. 1 shows base stations 100 acting as transmitters of the single frequency network transmissions and a controller 200 which controls the base stations 200. The controller 200 may for example act as centralized source of data conveyed by the single frequency network transmissions and may also control the base stations 100 in such a way that the single frequency network transmissions are performed in a synchronous manner on a given frequency. In the illustrated example, it is further assumed that the controller is responsible for selecting the frequency on which the single frequency network transmissions are performed. In the following such frequency will also be referred to as operating frequency. The controller 200 may for example correspond to a Broadcast Multicast Service Centre (BM-SC) of the MBMS or eMBMS technology, or an Operations Support System (OSS) node.

Further, FIG. 1 illustrates exemplary radio communication devices 10 which may act as recipients of the single frequency network transmissions. The radio communication devices 10 may correspond to various kinds of user equipment (UE), e.g., to a cellular phone, a portable computer with cellular connectivity, or a stationary computer with cellular connectivity.

Figure 2:
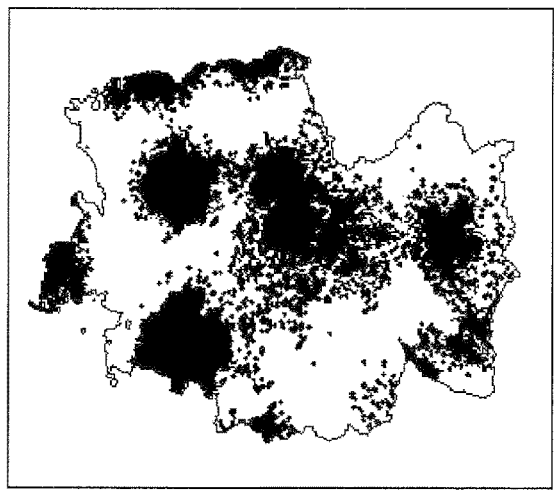
FIG. 2 shows an example of geographical utilization of a set of frequencies by TV broadcast operation.
Figure 2:
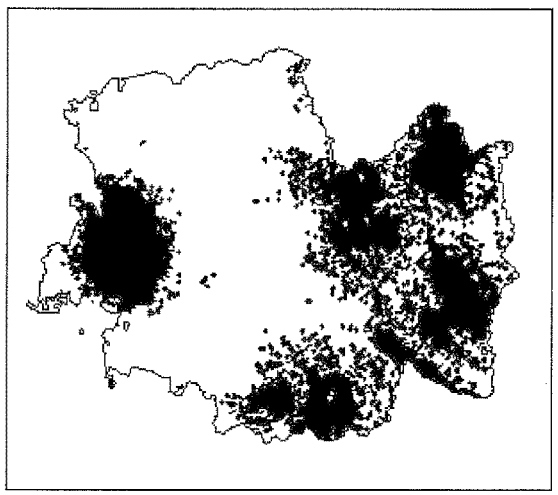
Figure 2:
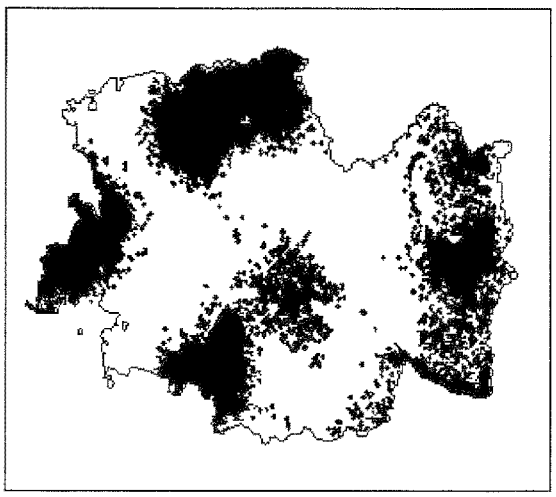

In the illustrated examples, it is assumed that a set of frequencies is available to be used as operating frequencies for performing the single frequency network transmissions, and that the availability and/or transmission characteristics may vary geographically or depending on the frequency. For example, the available frequencies may be from a TV White Space (TVWS), and thus a certain frequency may be available only in those parts of a coverage area of the radio communication network where the frequency is not utilized for TV broadcast operation. An example of such geographically varying availability is shown in FIG. 2, where dark parts on a map of Germany indicate utilization of three different frequencies F1, F2, F3 by TV broadcast operation. Further, the performance of single frequency network transmissions which can be achieved in these parts of the coverage region may vary geographically, e.g., due to varying levels of interference by the TV broadcast operation in neighboring regions or due to variations of local terrain characteristics. For consideration of such geographical variations, the coverage area is divided into subareas, in the following also referred to as pixels. For example, this dividing of the coverage area may be performed by tessellation. The parameters of such tessellation operation, e.g., grid density, may depend on the spacing and positions of base stations which perform the single frequency network transmissions and also on the geographical variations in the TV broadcast utilization of the considered frequencies. For example, this utilization is homogeneous over wider regions, a lower grid density may be applied. In the assumed cellular network scenario, a pixel will include one or more cells of the cellular network.

In the illustrated concepts, an MBMS or eMBMS service may be transmitted in multiple MBSFN areas each using a different operating frequency. These MBSFN areas may be contiguous or discontiguous. The operating frequencies for the different MBSFN areas may be selected with the aim of utilizing a minimum set of frequencies for each service, thereby allowing for maximizing overall capacity which can be achieved by the available frequencies. In the process of selecting the operating frequencies, it may be taken into account that for MBSFN transmissions, an MCS is applied which is determined statically according to a quality criterion, which typically is defined by requiring that the Transport Block Error Rate (BLER) is below a certain threshold for 95% of the recipients. Due to the above-mentioned geographical variations each frequency offers only low performance in certain geographical regions. Accordingly, if a single frequency were utilized for performing MBSFN transmissions in the entire coverage area, the MCS would have to be selected to achieve the desired quality criterion even in these regions of low performance, resulting in low overall throughput. Therefore, the illustrated concepts are based on a mechanism of selecting the operating frequencies which locally avoids utilization of frequencies which offer only low performance. In the following, this mechanism will be further explained by referring to a corresponding method of controlling single frequency network transmissions in a radio communication network.

Figure 3:
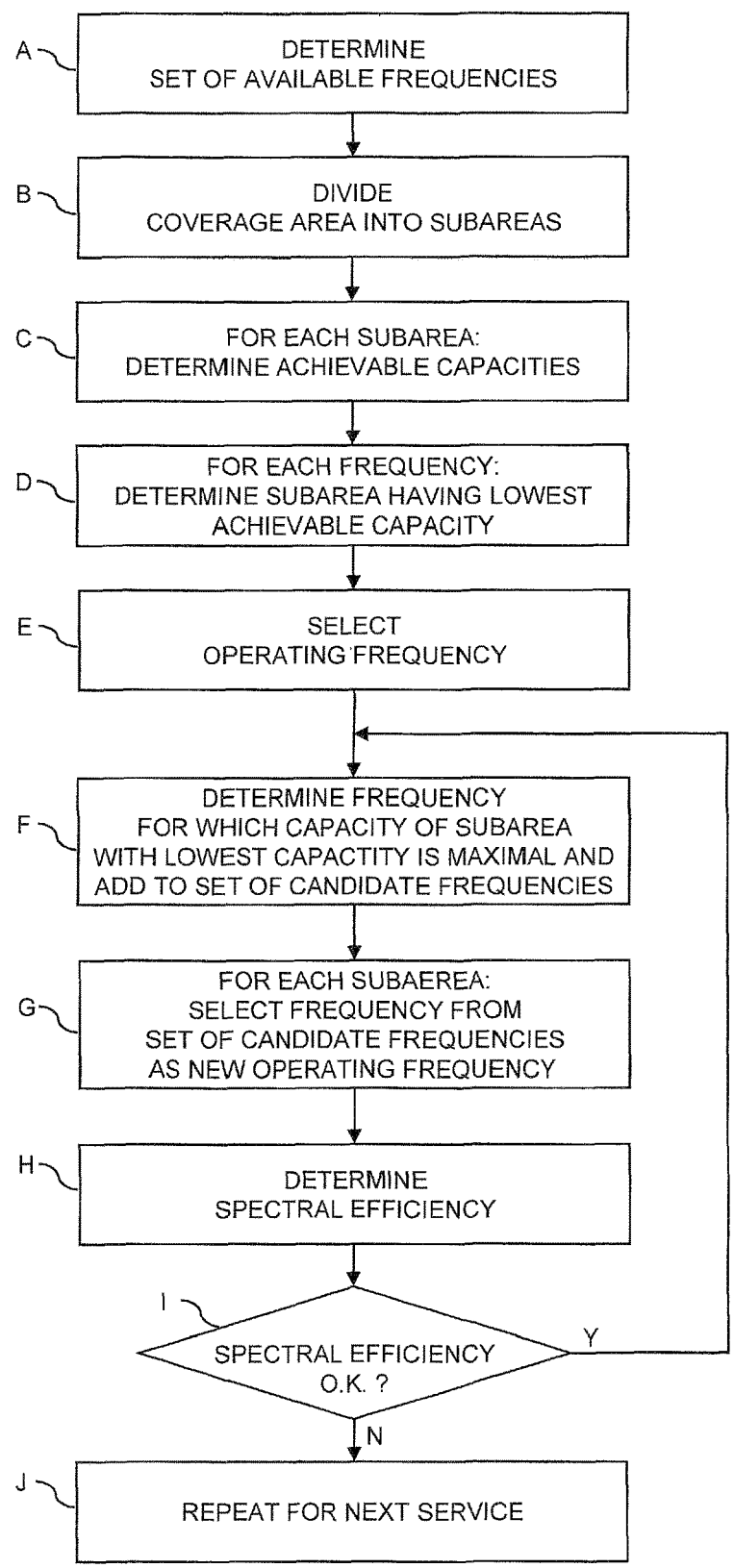
FIG. 3 shows a flowchart for illustrating a method according to an embodiment of the invention.

FIG. 3 shows a flowchart for illustrating the method. As mentioned above, the single frequency network transmissions may be MBSFN transmissions in a cellular network. The method may be performed by a device which controls the single frequency network transmissions, such as the controller 200 of FIG. 1. If a processor-based implementation of the device is used, the steps of the method may be performed by one or more processors of the device.

At step A) a set of multiple available frequencies is determined. The frequencies may be from a white space with locally differing usage by at least one broadcasting service. For example, these frequencies may be TVWS frequencies, such as the frequencies F1, F2, F3 of FIG. 2. The determination of the frequencies may be performed in a dynamic manner, e.g., depending on the time-dependent and/or location dependent variations in the utilization of the frequencies by a TV broadcasting service.

At step B), a coverage area of the radio communication network is divided into a set of subareas, also referred to as pixels. This may be accomplished by tessellation of the coverage area. If the radio communication network is a cellular network, each subarea may include one or more cells of the cellular network.

At step C), for each frequency from the set of available frequencies and for each of the subareas a capacity achievable by single frequency network transmissions in the subarea C) is determined. The capacity may for example be determined in terms of a data throughput. The capacities may be determined depending on a signal strength and a level of interference expected for the single frequency transmissions in the subarea. For example, an SINR may be determined for the given subarea and frequency, e.g., based on measurement reports, and the capacity may be determined depending on the SINR. Such measurement reports may be provided by base stations performing the single frequency network transmissions. In an exemplary scenario, each base station may report a path loss, and the SINR for the single frequency network transmissions may be determined as the path loss L, multiplied by a transmit power P applied by the base station when performing the single frequency network transmissions, and divided by an interference and noise signal strength IN, i.e., as $$SINR = L \times P/IN. \quad (1)$$

Here, the interference and noise signal strength may for example include interference from within the radio communication network, e.g., due to radio transmissions by other base stations or by UEs, interference from broadcast transmitters on the considered frequency, e.g., TV broadcast transmitters, and/or various noise contributions. The SINR may be estimated to represent a 5% margin of the worst channel conditions in the given subarea, e.g., by statistic analysis of multiple measurements performed in the subarea.

Figure 4:
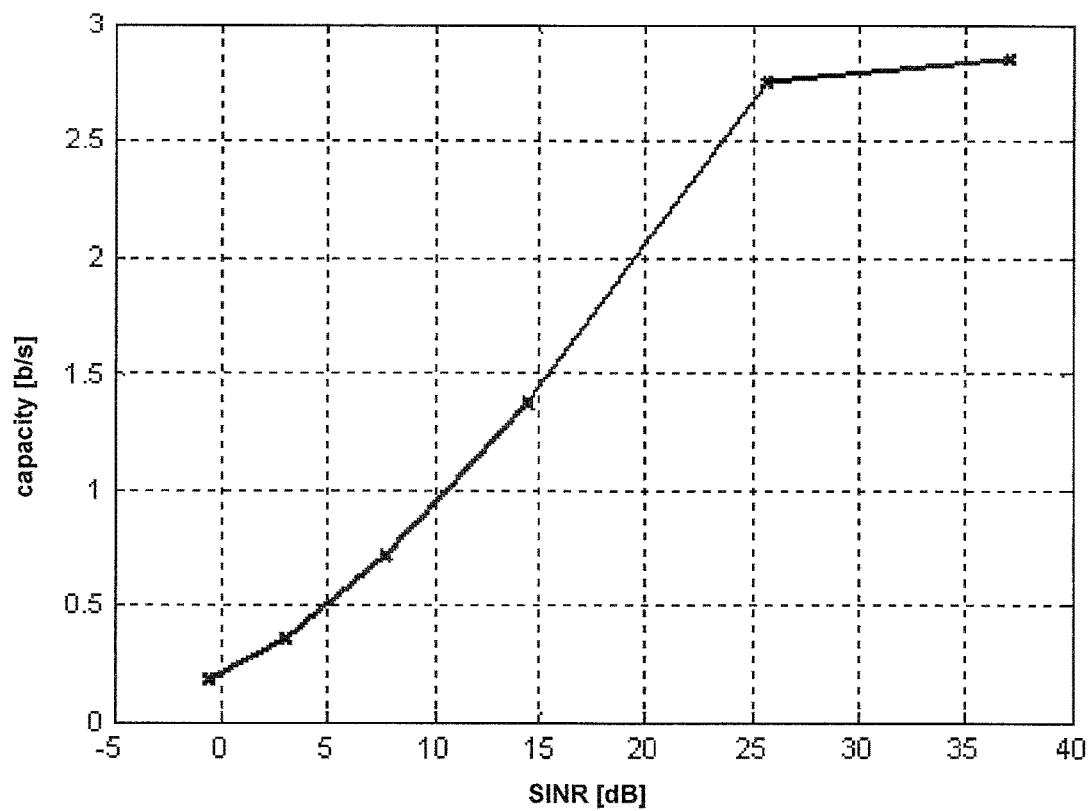
FIG. 4 shows a relation of signal to interference plus noise ratio (SINR) to achievable capacity as assumed according to an embodiment of the invention.

A predefined relation may be utilized to determine the capacity from the SINR. Here, a lookup table and/or some mathematical function could be applied. An exemplary relation which could be applied is illustrated in FIG. 4. As can be see, the capacity may increase as the SINR increases, and may converge towards a saturation value at high SINR. The capacity may also depend on the MCS applied for the single frequency transmissions in the subarea. As a general rule, the MCS directly determines the capacity, or least gives an upper limit for the capacity, because the MCS defines how many bits per transport block can be transmitted. This may be considered by providing a predefined relation of SINR to capacity for each possible MCS.

If the frequencies are from a white space of at least one broadcasting service, the capacities may also be determined depending on an expected activity level of the at least one broadcasting service in the subarea. For example, this expected activity level may be reflected by a corresponding interference contribution in Eq. (1).

At step D), that one of the subareas which has the lowest capacity is determined. This is accomplished for each frequency from the set of available frequencies. This subarea will typically determine the MCS which can be utilized for the frequency.

At step E), that one of the frequencies from the set of available frequencies, for which the capacity of the subarea having the lowest capacity is maximal, is selected as operating frequency for performing single frequency transmissions in the subareas.

At step F), the subarea having the lowest capacity on the respective selected operating frequency is determined. For this subarea, that one of the frequencies from the set of available frequencies is determined, for which the achievable capacity in this subarea is maximal. This frequency is added to a set of candidate frequencies. At least in the subarea having the lowest capacity, this frequency offers a higher capacity than the operating frequency selected at step D). At the same time, this frequency may be removed from the set of available frequencies.

At step G) for each of the subareas, that frequency from the set of candidate frequencies, for which the achievable capacity in the respective subarea is maximal, is selected as new operating frequency for performing single frequency transmissions in this subarea. Accordingly, different operating frequencies may be selected for different subareas, thereby improving overall capacity of all subareas at the cost of utilizing more frequencies.

At step H), a spectral efficiency is determined based on the achievable capacity on the operating frequency selected for each of the subareas and based on a number of frequencies in the set of candidate frequencies. This may involve determining the achievable capacity on the selected operating frequency for each of the subareas, and determining a minimum capacity MINCAP of these achievable capacities on the selected operating frequency, i.e., a minimum capacity over all subareas. Another way to determine the minimum capacity over all subareas would be to utilize the SINR for each of the candidate frequencies and in the different subareas to first determine a frequency dependent minimum capacity MINCAPF(frequency) and calculate the minimum capacity over all subareas as the minimum over the candidate frequencies, i.e., as MINCAP=min(MINCAPF(frequency)).

The spectral efficiency may then be determined based on a ratio of the minimum capacity and a number of frequencies NUMF in the set of candidate frequencies, e.g., as $$SEFF=\text{MINCAP}/\text{NUMF}. \qquad (2)$$

In this case, the minimum capacity MINCAP is utilized to represent the overall capacity which can be achieved by the single frequency transmissions in all subareas. This is useful in scenarios where the single frequency transmissions are utilized to provide the same service in all subareas, which means that there is no benefit from excess capacity in some of the subareas. In other scenarios, the overall capacity could be represented in a different manner, e.g., based on an average over all subareas or some other statistic.

At step I), it is decided whether to repeat steps F) to H). This decision is performed depending on the spectral efficiency determined at step H. For example, repeating steps F) to H) may be ended in response to the determined spectral efficiency being smaller than a previously determined spectral efficiency, i.e., smaller than the spectral efficiency determined in the preceding iteration of steps F) to H). Alternatively or in addition, the decision of step I) may also involve a comparison of the spectral efficiency to a threshold value. For example, repeating of steps F) to H) may be ended in response to the determined spectral efficiency being smaller than the threshold value, or an increase of the spectral efficiency as compared to the spectral efficiency determined in the preceding iteration of steps F) to H) being smaller than a threshold.

If it is decided not to end repeating steps F) to H), as indicated by branch "Y", the method returns to step F) to add another frequency to the set of candidate frequencies and select a new operating frequency in one or more of the subareas. Otherwise, if it is decided to end repeating steps F) to H), at least a part of the method may be repeated for another service provided by the single frequency transmissions, as indicated by branch "N" and step J). This may involve returning to step A). In such cases, the set of available frequencies used for the next service may include the remaining frequencies from the set of available frequencies, which were not yet selected as operating frequencies. By utilizing frequencies which were not yet selected as operating frequencies, interference between different services on the same operating frequency may be avoided. If it is decided to end the repeating of steps F) to H), the addition of the candidate frequency at step F) and any selection of this candidate frequency at step G) may be reversed, e.g., in response to determining at step I) that the spectral efficiency was lowered.

As mentioned above, for a given service carried by the single frequency transmissions the determination of the operating frequencies may be performed according to steps A) to I). If the single frequency transmissions are used to carry multiple services, the determination of the operating frequencies may be performed according to steps A) to I) separately for each of multiple different services carried by the single frequency transmissions.

After applying the method of FIG. 3 for selecting operating frequencies F1, F2, F3 for different services S1, S2, a situation as schematically illustrated in FIG. 5 may result. As can be seen from the illustration, the same service S1, S2 may be carried by operating frequencies F1, F2, F3 which differ between the subareas. The subareas utilizing the same operating frequency F1, F2, F3 may be contiguous or discontiguous.

Figure 6:
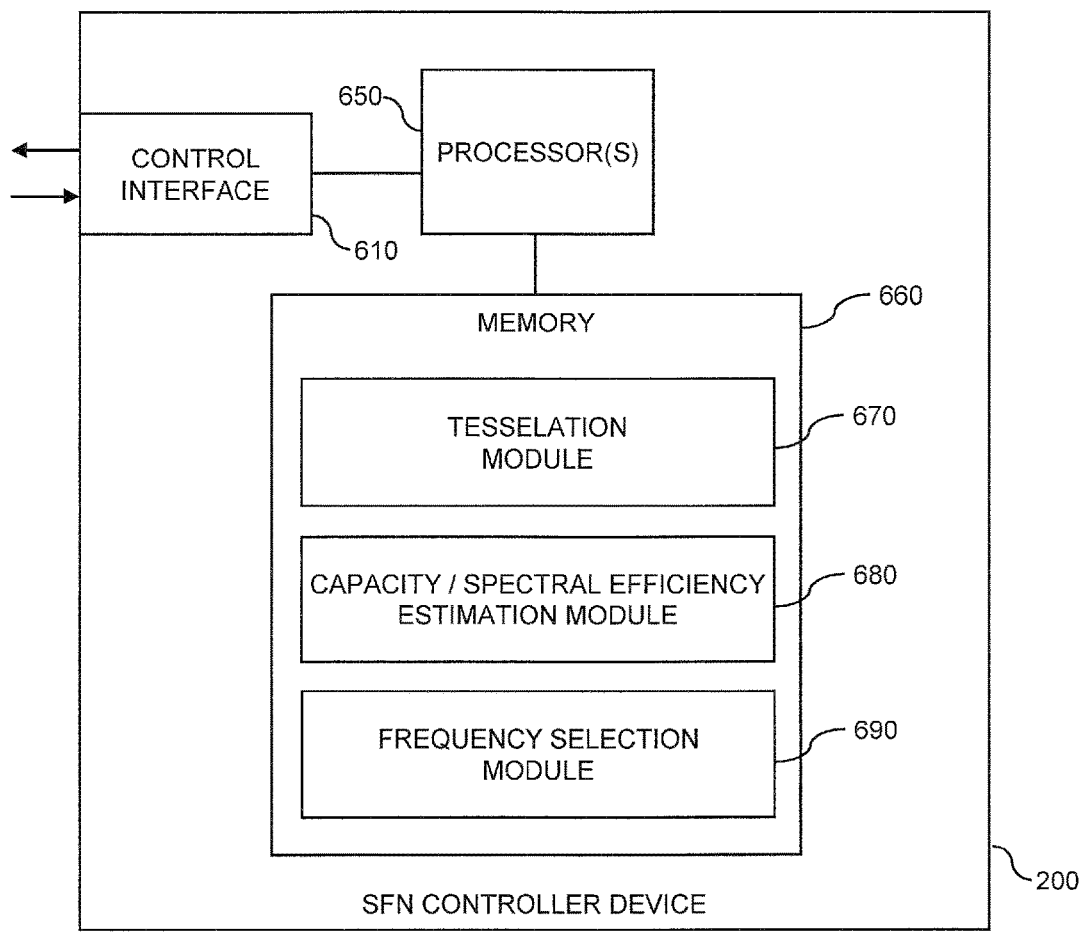
FIG. 6 schematically illustrates a device according to an embodiment of the invention.

FIG. 6 illustrates exemplary structures which may be used for implementing the above concepts in a device for controlling single frequency network transmissions, e.g., in the controller 200.

As illustrated, the device may include a control interface 610 for controlling the single frequency network transmissions. The control interface 610 may be utilized to indicate the selected operating frequencies to the base stations 100. Further, the control interface 610 could also be utilized for receiving measurement reports from the base stations 100, which can then be used for estimating the SINR.

Further, the device may include one or more processors 650 coupled to the interface 610, and a memory 660 coupled to the processor(s) 650. The memory 660 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 660 includes suitably configured program code to be executed by the processor(s) 650 so as to implement the above-described functionalities for selecting operating frequencies. In particular, the memory 660 may include various program code modules for causing the device to perform operations corresponding to the method steps of FIG. 3.

As illustrated, the memory 660 may include a tessellation module 670 for implementing the above-described functionalities of dividing the coverage area into subareas, e.g., as explained in connection with step B) of FIG. 3. Further, the memory 660 may include a capacity/spectral efficiency estimation module 680 for implementing the above-described functionalities of determining the achievable capacities and the spectral efficiency, e.g., as explained in connection with steps C) and H) of FIG. 3. Further, the memory 660 may include a frequency selection module 690 for implementing the above-described functionalities of selecting operating frequencies, e.g., as explained in connection with steps E) and G) of FIG. 3.

It is to be understood that the structures as illustrated in FIG. 6 are merely schematic and that the device may actually include further components which, for the sake of clarity, have not been illustrated, e.g., further interfaces or processors. Also, it is to be understood that the memory 660 may include further types of program code modules, which have not been illustrated, e.g., program code modules for implementing known functionalities of a BM-SC or similar controller for single frequency network transmissions. According to some embodiments, also a computer program may be provided for implementing functionalities of the device, e.g., in the form of a physical medium storing the program code and/or other data to be stored in the memory 660 or by making the program code available for download or by streaming.

As can be seen, the concepts as described above may be used for efficiently selecting frequencies utilized for MBSFN transmissions or other kinds of single frequency network transmissions. In particular, the concepts may be applied for dynamically optimizing overall capacity which can be achieved by the single frequency network transmissions, while avoiding excessive usage of the available frequency resources for the same service.

It is to be understood that the examples and embodiments as explained above are merely illustrative and susceptible to various modifications. For example, the illustrated concepts may be applied in connection with various radio technologies, without limitation to the above-mentioned example of the UMTS or LTE radio technology. Further, the single frequency network transmissions may be utilized to carry various kinds of services, without limitation to the above-mentioned MBMS services. Moreover, it is to be understood that the above concepts may be implemented by using correspondingly designed software to be executed by one or more processors of an existing device, or by using dedicated device hardware.

The invention claimed is:

1. A method of controlling single frequency network transmissions in a radio communication network, the method comprising:
   A) determining a set of multiple available frequencies;
   B) dividing a coverage area of the radio communication network into a set of subareas;
   C) for each frequency from the set of available frequencies and for each of the subareas, determining a capacity achievable by single frequency network transmissions in the subarea;
   D) for each frequency from the set of available frequencies, determining that one of the subareas which has the lowest capacity;
   E) selecting that one of the frequencies from the set of available frequencies, for which the capacity of the subarea having the lowest capacity is maximal, as an operating frequency for performing single frequency transmissions in the subareas;
   F) for the subarea having the lowest capacity on the respective selected operating frequency determining that one of the frequencies from the set of available frequencies, for which the achievable capacity in this subarea is maximal and adding this frequency to a set of candidate frequencies;
   G) for each of the subareas, selecting that frequency from the set of candidate frequencies, for which the achievable capacity in the respective subarea is maximal, as a new operating frequency for performing single frequency transmissions in this subarea;
   H) determining a spectral efficiency based on the achievable capacity on the operating frequency selected for each of the subareas and a number of frequencies in the set of candidate frequencies; and
   I) depending on the spectral efficiency, repeating steps F) to H).

2. The method of claim 1, further comprising:
   for each of the subareas, determining the achievable capacity on the selected operating frequency;
   determining a minimum capacity of the achievable capacities on the selected operating frequency; and
   determining the spectral efficiency based on a ratio of the minimum capacity and a number of frequencies in the set of candidate frequencies.

3. The method of claim 1, further comprising ending the repeating of steps F) to H) in response to the determined spectral efficiency being smaller than a previously determined spectral efficiency.

4. The method of claim 1, further comprising ending the repeating of steps F) to H) in response to the determined spectral efficiency being smaller than a threshold value.

5. The method of claim 1, wherein the capacities are determined depending on a signal strength and a level of interference expected for the single frequency transmissions in the subarea.

6. The method of claim 1, wherein the capacities are determined depending on a modulation and coding scheme applied for the single frequency transmissions in the subarea.

7. The method of claim 1, wherein the subareas are determined by tessellation of the coverage area.

8. The method of claim 1, wherein the radio communication network is a cellular network and each subarea comprises one or more cells of the cellular network.

9. The method of claim 1, wherein the frequencies are from a white space with locally differing usage by at least one broadcasting service.

10. The method of claim 9, wherein the capacities are determined depending on an expected activity level of the at least one broadcasting service in the subarea.

11. A device, comprising:
    an interface for controlling single frequency transmissions in a coverage area of a communication network; and
    processing circuitry, the processing circuitry configured to:
    a) determine a set of multiple available frequencies;
    b) divide a coverage area of the radio communication network into a set of subareas;
    c) for each frequency from the set of available frequencies and for each of the subareas, determine a capacity achievable by single frequency network transmissions in the subarea;
    d) for each frequency from the set of available frequencies, determine that one of the subareas which has the lowest capacity;
    e) select that one of the frequencies from the set of available frequencies, for which the capacity of the subarea having the lowest capacity is maximal, as an operating frequency for performing single frequency transmissions in the subareas;
    f) for the subarea having the lowest capacity on the respective selected operating frequency determine that one of the frequencies from the set of available frequencies, for which the achievable capacity in this subarea is maximal and add this frequency to a set of candidate frequencies;
    g) for each of the subareas, select that frequency from the set of candidate frequencies, for which the achievable capacity in the respective subarea is maximal, as a new operating frequency for performing single frequency transmissions in this subarea;
    h) determine a spectral efficiency based on the achievable capacity on the operating frequency selected for each of the subareas and a number of frequencies in the set of candidate frequencies; and
    i) depending on the spectral efficiency, repeat operations f) to h).

12. The device of claim 11, wherein the processing circuitry is configured to:
    for each of the subareas, determine the achievable capacity on the selected operating frequency;
    determine a minimum capacity of the achievable capacities on the selected operating frequency; and
    determine the spectral efficiency based on a ratio of the minimum capacity and a number of frequencies in the set of candidate frequencies.

13. The device of claim 11, wherein the processing circuitry is configured to end repeating operations f) to h) in response to the determined spectral efficiency being smaller than a previously determined spectral efficiency.

14. The device of claim 11, wherein the processing circuitry is configured to end repeating operations f) to h) in response to the determined spectral efficiency being smaller than a threshold value.

15. The device of claim 11, wherein the processing circuitry is configured to determine the capacities depending on a signal strength and a level of interference expected for the single frequency transmissions in the subarea.

16. The device of claim 11, wherein the processing circuitry is configured to determine the capacities depending on a modulation and coding scheme applied for the single frequency transmissions in the subarea.

17. The device of claim 11, wherein the processing circuitry is configured to determine the capacities depending on an expected activity level of the at least one broadcasting service in the subarea.

18. The device of claim 11, wherein the radio communication network is a cellular network and each subarea comprises one or more cells of the cellular network.

19. The device of claim 11, wherein the frequencies are from a white space with locally differing usage by at least one broadcasting service.

20. A non-transitory computer readable recording medium storing a computer program product for controlling single frequency network transmissions in a radio communication network, the computer program product comprising software instructions which, when run on processing circuitry of a device for controlling single frequency transmissions in a coverage area of a communication network, causes the device to:

A) determine a set of multiple available frequencies;
B) divide a coverage area of the radio communication network into a set of subareas;
C) for each frequency from the set of available frequencies and for each of the subareas, determine a capacity achievable by single frequency network transmissions in the subarea;
D) for each frequency from the set of available frequencies, determine that one of the subareas which has the lowest capacity;
E) select that one of the frequencies from the set of available frequencies, for which the capacity of the subarea having the lowest capacity is maximal, as an operating frequency for performing single frequency transmissions in the subareas;
F) for the subarea having the lowest capacity on the respective selected operating frequency, determine that one of the frequencies from the set of available frequencies, for which the achievable capacity in this subarea is maximal and add this frequency to a set of candidate frequencies;
G) for each of the subareas, select that frequency from the set of candidate frequencies, for which the achievable capacity in the respective subarea is maximal, as a new operating frequency for performing single frequency transmissions in this subarea;
H) determine a spectral efficiency based on the achievable capacity on the operating frequency selected for each of the subareas and a number of frequencies in the set of candidate frequencies; and
I) depending on the spectral efficiency, repeat steps F) to H).

* * * * *